US011512174B2

(12) United States Patent
Geho et al.

(10) Patent No.: US 11,512,174 B2
(45) Date of Patent: Nov. 29, 2022

(54) FIBER-REINFORCED MATERIAL AND STRUCTURE

(71) Applicant: TOYOTA BOSHOKU KABUSHIKI KAISHA, Aichi (JP)

(72) Inventors: Kosuke Geho, Aichi (JP); Masayuki Kito, Aichi (JP); Mitsutaka Sako, Aichi (JP); Goro Takahashi, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/481,122

(22) PCT Filed: Jan. 31, 2018

(86) PCT No.: PCT/JP2018/003288
§ 371 (c)(1),
(2) Date: Jul. 26, 2019

(87) PCT Pub. No.: WO2018/143298
PCT Pub. Date: Aug. 9, 2018

(65) Prior Publication Data
US 2020/0283589 A1 Sep. 10, 2020

(30) Foreign Application Priority Data

Feb. 3, 2017 (JP) ................ JP2017-018904

(51) Int. Cl.
*C08J 5/04* (2006.01)
*C08L 23/12* (2006.01)

(52) U.S. Cl.
CPC ............ *C08J 5/042* (2013.01); *C08L 23/12* (2013.01); *C08J 2323/12* (2013.01); *C08J 2423/08* (2013.01); *C08J 2477/04* (2013.01); *C08L 2205/03* (2013.01)

(58) Field of Classification Search
CPC .... C08J 5/042; C08J 2323/12; C08J 2423/08; C08J 2477/04; C08L 23/12; C08L 2305/03
See application file for complete search history.

(56) References Cited

U.S. PATENT DOCUMENTS

| | | | |
|---|---|---|---|
| 5,409,763 A | 4/1995 | Serizawa et al. | |
| 7,501,174 B2 | 3/2009 | Halahmi | |
| 7,842,373 B2 | 11/2010 | Halahmi | |
| 9,353,251 B2 | 5/2016 | Kito et al. | |
| 9,493,642 B2 | 11/2016 | Kito et al. | |
| 9,840,615 B2 | 12/2017 | Kito et al. | |
| 2007/0082159 A1 | 4/2007 | Mathieu | |
| 2008/0213572 A1 | 9/2008 | Halahmi | |
| 2009/0169803 A1 | 7/2009 | Halahmi | |
| 2013/0344282 A1 | 12/2013 | Yagi | |
| 2014/0364569 A1 | 12/2014 | Kito et al. | |
| 2014/0371394 A1 | 12/2014 | Kito et al. | |
| 2015/0322206 A1 | 11/2015 | Matsumoto | |
| 2017/0029610 A1 | 2/2017 | Kito et al. | |
| 2020/0032018 A1 | 1/2020 | Kito et al. | |

FOREIGN PATENT DOCUMENTS

| | | |
|---|---|---|
| CN | 106084606 A | 11/2016 |
| EA | 200800497 | 12/2008 |
| EP | 3597699 A1 | 1/2020 |
| JP | H03-124748 A | 5/1991 |
| JP | H06-192448 A | 7/1994 |
| JP | 06-234897 | 8/1994 |
| JP | 2010-168526 A | 5/2010 |
| JP | 2013-147645 | 8/2013 |
| JP | 2013-147646 | 8/2013 |
| JP | 2013-147647 | 8/2013 |
| JP | 2017-226765 | 12/2017 |
| RU | 2326138 | 6/2008 |

(Continued)

OTHER PUBLICATIONS

Extended European Search Report, European Patent Office, Application No. 18747720.3, dated Aug. 5, 2020.
Russian Office Action, Russian Patent Office, Application No. 2019127538, dated Sep. 21, 2020, English translation.
Japanese Office Action, Japanese Patent Office, Application No. 2017-018904, dated May 26, 2020, English translation.
India Office Action, India Patent Office, Application No. 201917033503, dated May 27, 2020.
International Search Report issued in International Patent Application No. PCT/JP2018/003288, dated Apr. 17, 2018, along with an English translation thereof.
Oliver-Ortega, H. et al. "Stiffness of bio-based polyamide 11 reinforced with softwood stone ground-wood fibers as an alternative to polypropylene-glass fiber composites", European Polymer Journal, Nov. 2016, vol. 84, pp. 481-489.
Office Action of Russian Application No. 2019127538, dated Feb. 13, 2020, with English translation.
Search Report of the Russian Application No. 2019127538, dated Jan. 31, 2018, with English translation.

(Continued)

*Primary Examiner* — Edward J Cain
(74) *Attorney, Agent, or Firm* — Greenblum & Bernstein, P.L.C.

(57) ABSTRACT

Disclosed herein are a fiber-reinforced material and an article made of the same. The fiber-reinforced material includes a fiber assembly and a matrix material coating the fiber assembly, the matrix material is a thermoplastic resin composition obtained by blending a polyolefin resin, a polyamide resin, and a modified elastomer that reacts with the polyamide resin. When a puncture test is performed at a striker speed of 1-4 msec and when a maximum impact force is applied is defined as $P_M$ and a deflection at break is defined as $P_B$, $P_B/P_M \geq 4$. When the amount of energy absorbed before a maximum impact force is applied is $E_1$, the amount of energy absorbed after a maximum impact force is applied and before break is $E_2$, and a total amount of absorbed energy of $E_1$ and $E_2$ is $E_T$, the ratio of $E_2$:$E_T$ is 70% or more.

8 Claims, 4 Drawing Sheets

(56) References Cited

FOREIGN PATENT DOCUMENTS

| | | |
|---|---|---|
| RU | 2551501 | 12/2017 |
| WO | 2014/152538 | 9/2014 |

OTHER PUBLICATIONS

The Indian Office Action of the corresponding Indian Application No. 201917033503, dated Apr. 1, 2021.

Jae Whan Cho et al., "Glass fiber-reinforced polyamide composites toughened with ABS and EPRg-MA", J. Applied Polymer Science, vol. 80 (3), 484-497. (Publication Date: Feb. 14, 2001).

Mehmet Dasdemir et al., "Reactive compatibilization of polyamide 6/polyethylene nonwoven based thermoplastic composites", European Polymer Journal, 63 (2015), 194-206, (Publication Date: Dec. 30, 2014).

Van-Ta Do et al., "Effect of polypropylene on the mechanical properties and water absorption of carbon-fiber-reinforced-polyamide-6/polypropylene composite", Composite Structures, (vol. 150, Aug. 15, 2016, pp. 240-245) (Publication Date: Dec. 31, 2016).

Office Action of corresponding Chinese Application No. 201880008836.2, dated May 7, 2021, with English machine translation.

Office Action in corresponding Chinese Application No. 201880008836.2 dated Mar. 11, 2022, along with English translation.

Office Action in corresponding Brazilian Application No. 112019011877-2 dated May 3, 2022, along with English translation.

Hongfeng, Yin, and Wei Jian. *Composite Materials*. Metallurgical Industry Press, 2010, along with English translation.

Office Action of the corresponding Korean Application No. 10-2019-7023494 dated May 11, 2022, along with English translation.

Chinese Office Action of the corresponding Chinese Application (No. 201880008836.2) dated Jul. 27, 2022, with English translation.

FIBER-REINFORCED MATERIAL AND STRUCTURE

TECHNICAL FIELD

The present invention relates to a fiber-reinforced material and an article. More specifically, the present invention relates to a fiber-reinforced material and an article which have excellent impact absorption capability.

BACKGROUND ART

A composite material called fiber-reinforced plastic has been conventionally known. In general, fiber-reinforced plastic is obtained by using a fiber assembly, such as a glass fiber non-woven fabric, as a core material, coating the core material with a resin (matrix resin) as a matrix material, and then curing the resin. At this time, a thermosetting resin is often used as the matrix resin. The reason why a thermosetting resin is selected is that many thermosetting resins are excellent in fluidity in their uncured state, and therefore the inside of the core material is easily impregnated therewith. However, thermosetting resins have a drawback that their brittleness increases due to curing, and therefore cured thermosetting resins are easily broken. For this reason, there has been a demand for a fiber-reinforced material and an article which are harder to break. From such a viewpoint, a thermoplastic resin may be used as the matrix resin.

As thermoplastic resins excellent in impact resistance, those disclosed in the following Patent Literatures 1 to 3 are known.

CITATIONS LIST

Patent Literatures

Patent Literature 1: JP 2013-147647 A
Patent Literature 2: JP 2013-147646 A
Patent Literature 3: JP 2013-147645 A

SUMMARY OF INVENTION

Technical Problems

As described above, when a thermoplastic resin is used as the matrix resin, for example, a polyamide resin such as nylon 6 may be used because it has excellent fluidity in its molten state and has excellent flexibility and impact resistance in its solidified state. However, a polyamide resin has a problem that it can exhibit excellent resistance to an impact input at a relatively low speed, but becomes harder to maintain sufficient impact resistance as the speed of an input impact increases.

It is to be noted that Patent Literature 1 discloses a thermoplastic resin composition that is obtained by blending a polyolefin resin, a polyamide resin, and a compatibilizer and that has a phase-separated structure having a continuous phase, a dispersed phase, and a fine dispersed phase further dispersed in the dispersed phase. Patent Literature 1 shows that this thermoplastic resin composition exhibits excellent impact resistance.

Patent Literature 2 discloses that when PA11, PA610, PA614, PA1010, and PA10T are used singly or in combination of two or more of them as a polyamide resin and an acid-modified olefin-based thermoplastic elastomer is used as a compatibilizer, a thermoplastic resin composition obtained by melt-mixing a polyolefin resin, the polyamide resin, and the compatibilizer can exhibit excellent impact resistance.

Further, Patent Literature 3 discloses that a thermoplastic resin composition obtained by melt-kneading a mixed resin, obtained by melt-kneading a polyamide resin and a compatibilizer, and a polyolefin resin exhibits excellent impact resistance.

However, Patent Literatures 1 to 3 do not discuss the application of such a thermoplastic resin composition to a fiber-reinforced material and an article.

In light of the above circumstances, it is an object of the present invention to provide a fiber-reinforced material and an article which are harder to break than ever before.

Solutions to Problems

In order to achieve the above object, the present invention provides the following.

A fiber-reinforced material according to claim 1 includes fiber and a matrix material coating the fiber, wherein
the matrix material is a thermoplastic resin composition obtained by blending a polyolefin resin, a polyamide resin, and a modified elastomer having a reactive group that reacts with the polyamide resin.

A fiber-reinforced material according to claim 2 is the fiber-reinforced material according to claim 1, wherein the fiber is a fiber assembly.

A fiber-reinforced material according to claim 3 is the fiber-reinforced material according to claim 1 or 2, wherein when a puncture test is performed at a striker speed of 1 msec or more but 4 msec or less,
a deflection (mm) when a maximum impact force (N) is applied is defined as $P_M$, and
a deflection (mm) at break is defined as $P_B$, $P_B/P_M \geq 4$.

A fiber-reinforced material according to claim 4 is the fiber-reinforced material according to claim 3, wherein when an amount of energy (Nmm) absorbed before a maximum impact force (N) is applied is defined as $E_1$,
an amount of energy (Nmm) absorbed after a maximum impact force (N) is applied and before break is defined as $E_2$, and
a total amount of absorbed energy (Nmm) as a total of the amount of energy $E_1$ and the amount of energy $E_2$ is defined as $E_T$, the ratio of $E_2$ to $E_T$ ($E_2/E_T$) is 70% or more.

A fiber-reinforced material according to claim 5 is the fiber-reinforced material according to any one of claims 1 to 4, wherein the fiber assembly is a woven/knit fabric.

A fiber-reinforced material according to claim 6 is the fiber-reinforced material according to any one of claims 1 to 4, wherein the fiber assembly is a non-woven fabric.

A fiber-reinforced material according to claim 7 is the fiber-reinforced material according to any one of claims 1 to 6, wherein the thermoplastic resin composition has a continuous phase (A) containing the polyolefin resin,
and a dispersed phase (B) dispersed in the continuous phase (A) and containing the polyamide resin.

A fiber-reinforced material according to claim 8 is the fiber-reinforced material according to claim 7, wherein the dispersed phase (B) further contains the modified elastomer, and the dispersed phase (B) has a continuous phase ($B_1$) containing the polyamide resin and a fine dispersed phase ($B_2$) dispersed in the continuous phase ($B_1$) and containing the modified elastomer.

An article according to claim 9 includes the fiber-reinforced material according to any one of claims 1 to 8.

Advantageous Effects of Invention

According to the present invention, it is possible to provide a fiber-reinforced material that is harder to break than ever before. Particularly, it is possible to obtain a fiber-reinforced material that is harder to break due to the action of increasing energy expended for the development of cracking before breakage.

According to the present invention, it is possible to provide an article that is harder to break than ever before. Particularly, it is possible to obtain an article that is harder to break due to the action of increasing energy expended for the development of cracking before breakage.

BRIEF DESCRIPTION OF DRAWINGS

The present invention is further described in the following detailed description with reference to non-limiting examples of exemplary embodiments of the present invention and the noted drawings, in which the same reference numerals represent the same parts throughout several views of the drawings.

DESCRIPTION OF EMBODIMENTS

The particulars shown herein are by way of example and for the purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for a fundamental understanding of the present invention, the description taken with the drawings making apparent to those skilled in the art how the several forms of the present invention may be embodied in practice.

[1] Fiber-Reinforced Material

Figure 1:
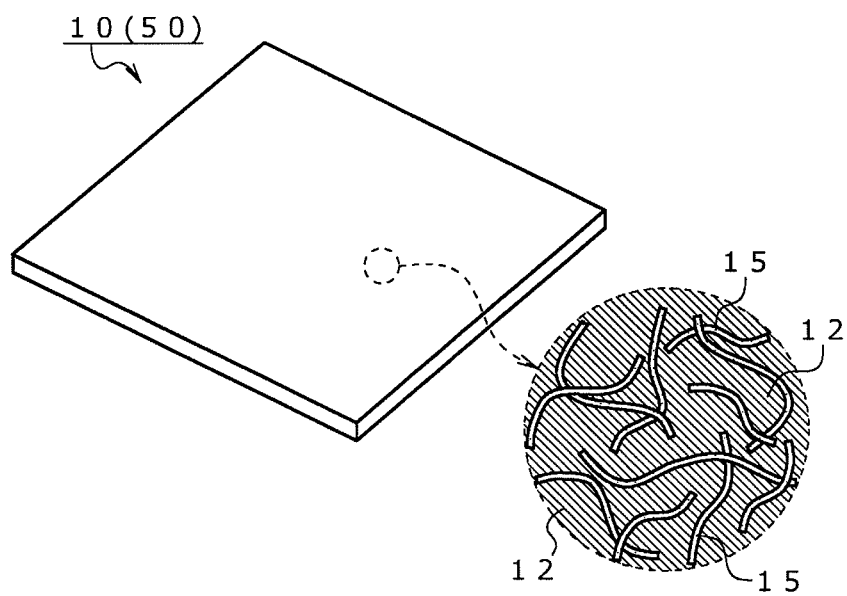
FIG. 1 is a schematic diagram explaining an example of a fiber-reinforced material or an article according to the present invention.
Figure 2:
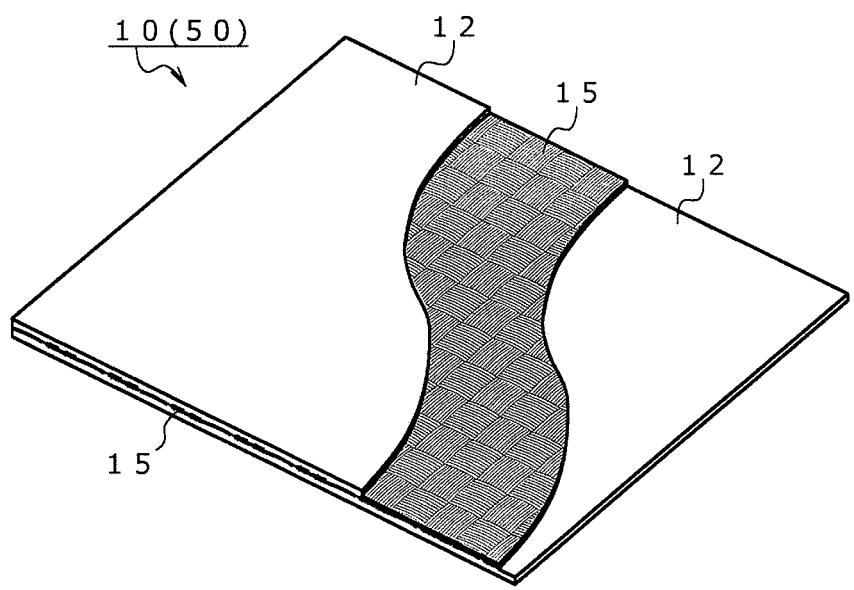
FIG. 2 is a schematic diagram explaining another example of a fiber-reinforced material or an article according to the present invention.

A fiber-reinforced material (10) according to the present invention includes fiber (15) and a matrix material (12) coating the fiber (15) (see FIG. 1 and FIG. 2).

Among them, the matrix material (12) is a thermoplastic resin composition obtained by blending a polyolefin resin, a polyamide resin, and a modified elastomer having a reactive group that reacts with the polyamide resin.

<1> Fiber

The fiber 15 is a material that acts as a reinforcing material in the fiber-reinforced material 10. The fiber 15 contained in the fiber-reinforced material 10 may be dispersed or aggregated. Usually, when having a short fiber length (that is, when being staple fiber), the fiber 15 contained in the fiber-reinforced material 10 is preferably dispersed (see FIG. 1). On the other hand, when having a long fiber length (that is, when being filament fiber), the fiber 15 is preferably contained as a fiber assembly 15 (see FIG. 2). More specifically, when the fiber 1 is a fiber assembly 15, the fiber-reinforced material 10 includes the fiber assembly 15 and the matrix material 12 coating the fiber assembly 15, wherein the matrix material 12 is a thermoplastic resin composition obtained by blending a polyolefin resin, a polyamide resin, and a modified elastomer having a reactive group that reacts with the polyamide resin.

When being staple fiber, the fiber 15 usually has a fiber length of less than 15 mm. When the fiber 15 is staple fiber (including a fibrous filler), its fiber length is preferably 1 mm or more, more preferably 3 mm or more, even more preferably 5 mm or more. On the other hand, when the fiber 15 is long fiber, its fiber length is preferably 15 mm or more. When the fiber length is 15 mm or more, each constituent fiber (single fiber) constituting the fiber assembly 15 is likely to intersect with other constituent fibers, which makes it possible to increase the tearing strength of the fiber assembly 15. From such a viewpoint, when the fiber 15 is long fiber, its fiber length is preferably 50 mm or more, more preferably 100 mm or more, even more preferably 500 mm or more. When the fiber 15 is long fiber, its maximum fiber length is not limited, and for example, an article made of the fiber-reinforced material according to the present invention may contain fiber that is continuous from one end to the other end of the article. In this case, the maximum fiber length may be, for example, $1 \times 10^6$ mm or less.

When the fiber 15 is contained as a fiber assembly 15, the fiber assembly 15 serves as a core material in the fiber-reinforced material 10. When the fiber 15 is a fiber assembly 15, the assembly form of constituent fibers constituting the fiber assembly 15 is not limited, and examples of the fiber assembly 15 include a woven fabric, a knit fabric, and a non-woven fabric (including a fiber deposit). These fiber assemblies may be used singly or in combination of two or more of them. The weaving pattern of the woven fabric, the knitting pattern of the knit fabric, and the accumulation pattern of the nonwoven fabric are not limited.

The thickness of the fiber assembly 15 is not limited, either, and may be, for example, $1 \times 10^{-3}$ mm or more but 100 mm or less. The mass per unit area of the fiber assembly 15 is not limited, either, and may be, for example, 0.1 g/m$^2$ or more but 100000 g/m$^2$ or less.

A material constituting the fiber 15 and the constituent fibers of the fiber assembly 15 is not limited, and may be an inorganic material, an organic material, or a combination of them.

Examples of inorganic fiber include glass fiber, carbon fiber, activated carbon fiber, ceramic fiber (e.g., silicate, titanate, or alumina), metallic fiber, and boron fiber. These fiber assemblies may be used singly or in combination of two or more of them.

Examples of organic fiber include natural fiber and synthetic fiber. These fiber assemblies may be used singly or in combination of two or more of them. Examples of the natural fiber include plant-based fiber (e.g., kenaf fiber) and animal fiber (e.g., animal hair, silk). Examples of the synthetic fiber include fiber obtained by forming a synthetic resin into fiber. Examples of such synthetic resin fiber include polyamide resin fiber (e.g., aliphatic polyamide (e.g., nylon fiber), aromatic polyamide (aramid fiber, trade name "Kevlar")), polyester resin fiber (e.g., aliphatic polyester, aromatic polyester (e.g., polyethylene terephthalate fiber, polyethylene naphthalate fiber)), polyolefin resin fiber (e.g., high-molecular-weight polyolefin (trade name "Dyneema"), and polybenzazole resin fiber (e.g., polyparaphenylenebenzobisoxazole fiber (trade name "Zylon")). Other examples of the synthetic resin fiber include vinylon fiber and polyarylate fiber. These fiber assemblies may be used singly or in combination of two or more of them.

Further, the form of the fiber is not limited, and the fiber may be spun yarn, filament yarn, or a combination of them. Further, the fiber may be monofilament, multifilament, or a combination of them.

It is to be noted that both staple fiber and long fiber may be contained as the fiber 15. A specific example of the fiber-reinforced material containing both staple fiber and long fiber as the fiber 15 includes one containing both a fiber assembly 15 and a fibrous filler.

<2> Matrix Material

The matrix material 12 is a material coating the fiber 15. In the fiber-reinforced material 10 according to the present invention, the matrix material 12 is a thermoplastic resin composition (see FIG. 1 and FIG. 2). Further, the matrix material 12 usually binds to the surface of the fiber 15. That is, the thermoplastic resin composition constituting the matrix material 12 binds to the fiber 15.

Particularly, when the fiber 15 is a fiber assembly 15, the thermoplastic resin composition constituting the matrix material 12 binds to the constituent fibers of the fiber assembly 15, and usually, the inside of the fiber assembly 15 is also impregnated with the matrix material 12. That is, when the fiber 15 is a fiber assembly 15, the matrix material 12 constituting the front surface of the fiber assembly 15 and the matrix material 12 constituting the back surface of the fiber assembly 15 are integrally fused in the fiber assembly 15 (see FIG. 2). In other words, the fiber assembly 15 is embedded in the matrix 12.

The matrix material 12 is a thermoplastic resin composition obtained by blending a polyolefin resin, a polyamide resin, and a modified elastomer having a reactive group that reacts with the polyamide resin.

(1) Polyolefin Resin

The polyolefin resin is an olefin homopolymer and/or an olefin copolymer.

An olefin constituting the polyolefin resin is not particularly limited, but examples thereof include ethylene, propylene, 1-butene, 3-methyl-1-butene, 1-pentene, 3-methyl-1-pentene, 4-methyl-1-pentene, and 1-hexene, and 1-octene. These fiber assemblies may be used singly or in combination of two or more of them.

Specific examples of the polyolefin resin include a polyethylene resin, a polypropylene resin, poly-1-butene, poly-1-hexene, and poly-4-methyl-1-pentene. These polymers may be used singly or in combination of two or more of them. That is, the polyolefin resin may be a mixture of two or more of the above polymers.

Examples of the polyethylene resin include an ethylene homopolymer and a copolymer of ethylene and another olefin. Examples of the latter include an ethylene-1-butene copolymer, an ethylene-1-hexene copolymer, an ethylene-1-octene copolymer, and an ethylene-4-methyl-1-pentene copolymer (the content of an ethylene-derived structural unit is 50% or more of the total structural units).

Examples of the polypropylene resin include a propylene homopolymer and a copolymer of propylene and another olefin.

Examples of the other olefin constituting the copolymer of propylene and the other olefin include the above-mentioned various olefins (except for propylene). Among them, for example, ethylene and 1-butene are preferred. That is, the copolymer of propylene and another olefin is preferably a propylene-ethylene copolymer or a propylene-1-butene copolymer.

The copolymer of propylene and another olefin may be either a random copolymer or a block copolymer.

It is to be noted that the content of a propylene-derived structural unit of the copolymer of propylene and another olefin is 50% or more of the total structural units.

In the thermoplastic resin composition, the polyolefin resin preferably contains a homopolymer, and more preferably contains a homopolymer as a main component (the content of the homopolymer is usually 70% by mass or more or may be 100% by mass with respect to the total mass of the polyolefin resin). More specifically, the homopolymer is preferably a homopolymer containing, as a monomer, one of olefins such as ethylene, propylene, 1-butene, 3-methyl-1-butene, 1-pentene, 3-methyl-1-pentene, 4-methyl-1-pentene, 1-hexene, and 1-octene, or a mixture of such homopolymers. Particularly, the polyolefin resin preferably contains a propylene homopolymer, and more preferably contains a propylene homopolymer as a main component (the content of the propylene homopolymer is usually 70% by mass or more or may be 100% by mass with respect to the total mass of the polyolefin resin).

When the polyolefin resin contains a homopolymer as its main component and the main component is a propylene homopolymer, another homopolymer other than the propylene homopolymer may be an ethylene homopolymer and/or a 1-butene homopolymer.

It is to be noted that the polyolefin resin is a polyolefin that has no affinity for the polyamide resin, and that has no reactive group capable of reacting with the polyamide resin. In this point, the polyolefin resin is different from the modified elastomer.

The average molecular weight (weight-average molecular weight) of the polyolefin resin contained in the thermoplastic resin composition is not particularly limited, but is preferably 10,000 or more but 500,000 or less, more preferably 100,000 or more but 450,000 or less, particularly preferably 200,000 or more but 400,000 or less.

The weight-average molecular weight is determined by gel permeation chromatography (GPC) based on polystyrene standards. When the polyolefin resin used in the present invention is a homopolymer, the above ranges of the weight-average molecular weight can be respectively regarded as the numerical ranges of a number-average molecular weight.

(2) Polyamide Resin

The polyamide resin is a polymer having a chain like skeleton formed by polymerizing a plurality of monomers via amide bonds (—NH—CO—).

Examples of a monomer constituting the polyamide resin include amino acids such as 6-aminocaproic acid, 11-aminoundecanoic acid, 12-aminododecanoic acid, and paraaminomethyl benzoic acid, and lactams such as ε-caprolactam, undecane lactam, and ω-lauryl lactam. These fiber assemblies may be used singly or in combination of two or more of them.

Further, the polyamide resin can be obtained also by copolymerization of a diamine and a dicarboxylic acid. In this case, examples of the diamine as a monomer include: aliphatic diamines such as ethylene diamine, 1,3-diaminopropane, 1,4-diaminobutane, 1,6-diaminohexane, 1,7-diaminoheptane, 1,8-diaminooctane, 1,9-diaminononane, 1,10-diaminodecane, 1,11-diaminoundecane, 1,12-diaminododecane, 1,13-diaminotridecane, 1,14-diaminotetradecane, 1,15-diaminopentadecane, 1,16-diaminohexadecane, 1,17-diaminoheptadecane, 1,18-diaminooctadecane, 1,19-diaminononadecane, 1,20-diaminoeicosane, 2-methyl-1,5-diaminopentane, and 2-methyl-1,8-diaminooctane; alicyclic diamines such as cyclohexane diamine and bis-(4-aminocyclohexyl)methane; and aromatic diamines such as xylylene diamines (e.g., p-phenylenediamine and m-phenylenediamine). These fiber assemblies may be used singly or in combination of two or more of them.

Examples of the dicarboxylic acid as a monomer include: aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, brasylic acid, tetradecanedioic acid, pentadecanedioic acid, and octadecanedioic acid; alicyclic dicarboxylic acids such as cyclohexanedicarboxylic acid; and aromatic dicarboxylic acids such as phthalic acid, terephthalic acid, isophthalic acid, and naphthalenedicarboxylic acid. These fiber assemblies may be used singly or in combination of two or more of them.

Specific examples of the polyamide resin include polyamide 6, polyamide 66, polyamide 11, polyamide 610, polyamide 612, polyamide 614, polyamide 12, polyamide 6T, polyamide 6I, polyamide 9T, polyamide MST, polyamide 1010, polyamide 1012, polyamide 10T, polyamide MXD6, polyamide 6T/66, polyamide 6T/6I, polyamide 6T/6I/66, polyamide 6T/2M-5T, and polyamide 9T/2M-8T. These polyamides may be used singly or in combination of two or more of them.

In the present invention, among the above-mentioned various polyamide resins, plant-derived polyamide resins can be used. Plant-derived polyamide resins are preferred from the viewpoint of environmental protection (particularly from the viewpoint of carbon neutral) because they are resins using monomers derived from plant-derived components such as vegetable oils.

Examples of the plant-derived polyamide resins include polyamide 11 (hereinafter also simply referred to as "PA11"), polyamide 610 (hereinafter also simply referred to as "PA610"), polyamide 612 (hereinafter also simply referred to as "PA612"), polyamide 614 (hereinafter also simply referred to as "PA614"), polyamide 1010 (hereinafter also simply referred to as "PA1010"), polyamide 1012 (hereinafter also simply referred to as "PA1012"), and polyamide 10T (hereinafter also simply referred to as "PA10T"). These fiber assemblies may be used singly or in combination of two or more of them.

Among the above-mentioned polyamide resins, PA11 has a structure in which monomers having 11 carbon atoms are linked via amide bonds. PA11 can be obtained using aminoundecanoic acid derived from castor oil as a monomer. The content of a structural unit derived from the monomer having 11 carbon atoms in PA11 is preferably 50% or more or may be 100% of all the structural units of PA11.

PA610 has a structure in which monomers having 6 carbon atoms and monomers having 10 carbon atoms are linked via amide bonds. PA610 can be obtained using sebacic acid derived from castor oil as a monomer. The total content of a structural unit derived from the monomer having 6 carbon atoms and a structural unit derived from the monomer having 10 carbon atoms in PA610 is preferably 50% or more or may be 100% of all the structural units of PA610.

PA1010 has a structure in which a diamine having 10 carbon atoms and a dicarboxylic acid having 10 carbon atoms are copolymerized. PA1010 can be obtained using 1,10-decanediamine (decamethylene diamine) and sebacic acid, which are derived from castor oil, as monomers. The total content of a structural unit derived from the diamine having 10 carbon atoms and a structural unit derived from the dicarboxylic acid having 10 carbon atoms in PA1010 is preferably 50% or more or may be 100% of all the structural units of PA1010.

PA614 has a structure in which a monomer having 6 carbon atoms and a monomer having 14 carbon atoms are linked via amide bonds. PA614 can be obtained using a plant-derived dicarboxylic acid having 14 carbon atoms as a monomer. The total content of a structural unit derived from the monomer having 6 carbon atoms and a structural unit derived from the monomer having 14 carbon atoms in PA614 is preferably 50% or more but may be 100% of all the structural units of PA614.

PA10T has a structure in which a diamine having 10 carbon atoms and terephthalic acid are linked via amide bonds. PA10T can be obtained using 1,10-decanediamine (decamethylene diamine) derived from castor oil as a monomer. The total content of a structural unit derived from the diamine having 10 carbon atoms and a structural unit derived from terephthalic acid in PA10T is preferably 50% or more or may be 100% of all the structural units of PA10T.

Among the above five plant-derived polyamide resins, PA11 is superior to the other four plant-derived polyamide resins in terms of low water absorbability, low specific gravity, and high biomass degree.

Polyamide 610 is inferior to PA11 in water absorption rate, chemical resistance, and impact strength, but is excellent in heat resistance (melting point) and rigidity (strength). Further, polyamide 610 is superior to polyamide 6 or polyamide 66 in terms of low water absorbability and size stability, and therefore can be used as an alternative to polyamide 6 or polyamide 66.

Polyamide 1010 is superior to PA11 in heat resistance and rigidity. Further, the biomass degree of polyamide 1010 is comparable to that of PA11, and therefore polyamide 1010 can be used for parts required to have higher durability.

Polyamide 10T has an aromatic ring in its molecular skeleton, and therefore has a higher melting point and higher rigidity than polyamide 1010. Therefore, polyamide 10T can be used in harsh environments (as parts required to have heat resistance or parts on which a force is to be applied).

The weight-average molecular weight of the polyamide resin is not particularly limited, and may be, for example, 5,000 or more but 100,000 or less, but is preferably 7,500 or more but 50,000 or less, more preferably 10,000 or more but 50,000 or less.

It is to be noted that the weight-average molecular weight of the polyamide resin is determined by gel permeation chromatography (GPC) based on polystyrene standards.

(3) Modified Elastomer

The modified elastomer is an elastomer having a reactive group that reacts with the polyamide resin. The modified elastomer is preferably an elastomer having an affinity not only for the polyamide resin through the use of the reactive group but also for the polyolefin resin. That is, the modified elastomer is preferably a compatibilizer having a reactive group that reacts with the polyamide resin and a compatibility with both the polyolefin resin and the polyamide resin.

It is to be noted that the modified elastomer contained in the thermoplastic resin composition may be an unreacted modified elastomer, a product obtained by reaction with the polyamide resin, or a mixture of them.

Examples of the reactive group include an acid anhydride group (—CO—O—OC—), a carboxyl group (—COOH), an epoxy group {—C$_2$O (a three-membered ring structure composed of two carbon atoms and one oxygen atom)}, an oxazoline group (—C$_3$H$_4$NO), and an isocyanate group (—NCO). These fiber assemblies may be used singly or in combination of two or more of them.

These reactive groups can be introduced by modification into an elastomer before modification (unmodified elastomer). Specific examples of the modified elastomer include an acid-modified elastomer, an epoxy-modified elastomer, and an oxazoline-modified elastomer. Among them, an acid-modified elastomer is preferred, and an acid anhydride-modified elastomer or a carboxylic acid-modified elastomer is more preferred.

This modified elastomer particularly preferably has an acid anhydride group or a carboxyl group in the side chain or at the end of its molecule. The acid modification amount is not particularly limited. For example, the number of acid anhydride groups or carboxyl groups contained in one molecule of the modified elastomer is preferably 1 or more, more preferably 2 or more but 50 or less, even more preferably 3 or more but 30 or less, particularly preferably 5 or more but 20 or less.

The above-mentioned modified elastomers may be used singly or in combination of two or more of them.

Examples of the elastomer before modification include an olefin-based elastomer and a styrene-based elastomer. From the viewpoint of compatibility with the polyolefin resin, an olefin-based elastomer is particularly preferred.

The olefin-based elastomer is preferably an α-olefin-based copolymer containing a structural unit derived from an α-olefin having 3 to 8 carbon atoms, and examples of such an α-olefin-based copolymer include an ethylene-α-olefin copolymer, an α-olefin copolymer, an α-olefin-non-conjugated diene copolymer, and an ethylene-α-olefin-non-conjugated diene copolymer. Among them, an ethylene-α-olefin copolymer, an α-olefin copolymer, and an ethylene-α-olefin-non-conjugated diene copolymer are particularly preferred.

Examples of the non-conjugated diene include: a linear non-cyclic diene compound such as 1,4-pentadiene, 1,4-hexadiene, 1,5-hexadiene, and 1,6-hexadiene; a branched chain non-cyclic diene compound such as 5-methyl-1,4-hexadiene, 3,7-dimethyl-1,6-octadiene, 5,7-dimethylocta-1,6-diene, 3,7-dimethyl-1,7-octadiene, 7-methylocta-1,6-diene, and dihydromyrcene; and an alicyclic diene compound such as tetrahydroindene, methyltetrahydroindene, dicyclopentadiene, bicyclo[2.2.1]-hepta-2,5-diene, 5-methylene-2-norbornene, 5-ethylidene-2-norbornene, 5-propenyl-2-norbornene, 5-isopropylidene-2-norbornene, 5-cyclohexylidene-2-norbornene, and 5-vinyl-2-norbornene.

Specific examples of the olefin elastomer include an ethylene-propylene copolymer, an ethylene-1-butene copolymer, an ethylene-1-pentene copolymer, an ethylene-1-hexene copolymer, an ethylene-1-octene copolymer, a propylene-1-butene copolymer, a propylene-1-pentene copolymer, a propylene-1-hexene copolymer, and a propylene-1-octene copolymer. Among them, an ethylene-propylene copolymer, an ethylene-1-butene copolymer, and an ethylene-1-octene copolymer are preferred.

Examples of the styrene-based elastomer (i.e., a styrene-based thermoplastic elastomer having a styrene skeleton) include a block copolymer of an aromatic vinyl compound and a conjugated diene compound and a hydrogenated product thereof.

Examples of the aromatic vinyl compound include: styrene; alkyl styrenes such as α-methyl styrene, p-methyl styrene, and p-tert-butyl styrene; p-methoxy styrene; and vinyl naphthalene.

Examples of the conjugated diene compound include butadiene, isoprene, 1,3-pentadiene, methyl pentadiene, phenyl butadiene, 3,4-dimethyl-1,3-hexadiene, and 4,5-diethyl-1,3-octadiene.

Specific examples of the styrene-based elastomer include a styrene-butadiene-styrene (SBS) copolymer, a styrene-isoprene-styrene (SIS) copolymer, a styrene-ethylene/butylene-styrene (SEBS) copolymer, and a styrene-ethylene/propylene-styrene (SEPS) copolymer.

Examples of the acid anhydride for acid modification include maleic anhydride, phthalic anhydride, itaconic anhydride, succinic anhydride, glutaric anhydride, adipic anhydride, citraconic anhydride, tetrahydrophthalic anhydride, and butenylsuccinic anhydride. Among them, maleic anhydride, phthalic anhydride, and itaconic anhydride are preferred.

Examples of the carboxylic acid include acrylic acid, methacrylic acid, maleic acid, fumaric acid, itaconic acid, and citraconic acid.

Among the above-mentioned various modified elastomers, the modified elastomer contained in the thermoplastic resin composition is preferably an acid anhydride-modified elastomer, particularly preferably a maleic anhydride-modified elastomer, more particularly preferably an acid modified α-olefin-based copolymer containing a structural unit derived from an α-olefin having 3 to 8 carbon atoms. Specifically, an olefin-based thermoplastic elastomer having, as a skeleton, a copolymer of ethylene or propylene and an α-olefin having 3 to 8 carbon atoms is preferred. More specifically, a maleic anhydride-modified elastomer is preferred such as a maleic anhydride-modified ethylene-propylene copolymer, a maleic anhydride-modified ethylene-1-butene copolymer, a maleic anhydride-modified ethylene-1-hexene copolymer, or a maleic anhydride-modified ethylene-1-octene copolymer. Specific examples of the modified elastomer include α-olefin copolymers of "TAFMER" series (trade name) manufactured by Mitsui Chemicals, Inc. and "AMPLIFY" series (trade name) manufactured by Dow Chemical.

The weight-average molecular weight of the modified elastomer contained in the thermoplastic resin composition is not particularly limited, and may be, for example, 10,000 or more but 500,000 or less, but is preferably 20,000 or more but 500,000 or less, more preferably 30,000 or more but 300,000 or less.

It is to be noted that the weight-average molecular weight of the modified elastomer is determined by gel permeation chromatography (GPC) based on polystyrene standards.

(4) Other Components

The thermoplastic resin composition may contain, as a thermoplastic resin, only the above-described thermoplastic resin without containing a thermoplastic resin other than the above-described polyolefin resin, polyamide resin, and modified elastomer, but may contain other components in addition to them. These fiber assemblies may be used singly or in combination of two or more of them.

An example of the other components includes another thermoplastic resin. Specific examples of the other thermoplastic resin include polyester-based resins (polybutylene terephthalate, polyethylene terephthalate, polycarbonate, polybutylene succinate, polyethylene succinate, and polylactic acid). These fiber assemblies may be used singly or in combination of two or more of them.

When another thermoplastic resin is contained and a total amount of the above-described polyolefin resin, polyamide resin, and modified elastomer and the other thermoplastic resin is taken as 100% by mass, the ratio of the other thermoplastic resin is preferably 25% by mass or less (more preferably 20% by mass or less, even more preferably 15% by mass or less, even more preferably 10% by mass or less, even more preferably 5% by mass or less but 1% by mass or more).

Examples of an additive that can be added include a nucleating agent, an antioxidant, a thermal stabilizer, a weatherproofer, a light stabilizer, a plasticizer, an ultraviolet absorber, an antistatic agent, a flame retardant, a slip agent, an antiblocking agent, an antifog agent, a lubricant, a pigment, a dye, a disperser, a copper inhibitor, a neutralizer, an anti-foam agent, a weld strength improver, a natural oil, a synthetic oil, and a wax. These fiber assemblies may be used singly or in combination of two or more of them.

Examples of the nucleating agent and the reinforcing filler include: silicates such as talc, silica, clay, montmorillonite, and kaolin; carbonates such as calcium carbonate, lithium carbonate, and magnesium carbonate; metal oxides such as alumina, titanium oxide, and zinc oxide; metals such as aluminum, iron, silver, and copper; hydroxides such as aluminum hydroxide and magnesium hydroxide; sulfides such as barium sulfate; carbides such as wood charcoal and bamboo charcoal; titanides such as potassium titanate and barium titanate; celluloses such as cellulose microfibril and cellulose acetate; and carbons such as fullerene.

Examples of the antioxidant include phenol-based compounds, organic phosphite-based compounds, and thioether-based compounds.

Example of the thermal stabilizer include hindered amine-based compounds.

Examples of the ultraviolet absorber include benzophenone-based compounds, benzotriazole-based compounds, and benzoate-based compounds.

Examples of the antistatic agent include nonionic compounds, cationic compounds, and anionic compounds.

Examples of the flame retardant include halogen-based compounds, phosphorus-based compounds (e.g., nitrogen-containing phosphate compounds, phosphoric acid esters), nitrogen-based compounds (e.g., guanidine, triazine, melamine, and derivatives thereof), inorganic compounds (e.g., metal hydroxides), boron-based compounds, silicone-based compounds, sulfur-based compounds, and red phosphorus-based compounds.

Examples of the flame retardant aid include antimony compounds, zinc compounds, bismuth compounds, magnesium hydroxide, and clayey silicate.

<3> Phase Structure

The thermoplastic resin composition is obtained by blending a polyolefin resin, a polyamide resin, and a modified elastomer. The phase structure of the thermoplastic resin composition is not particularly limited, and the thermoplastic resin composition may have any phase structure. For example, the thermoplastic resin composition may have the following phase structure (1), (2), or (3).

Phase structure (1): A phase structure having a continuous phase (A) containing a polyolefin resin and a dispersed phase (B) dispersed in the continuous phase (A) and containing a polyamide resin (see FIG. 3) It is to be noted that the phase structure (1) does not coexist with another phase structure having a continuous phase containing a polyamide resin and a dispersed phase dispersed in the continuous phase.

Phase structure (2): A phase structure having a continuous phase containing a polyamide resin and a dispersed phase dispersed in the continuous phase and containing a polyolefin resin It is to be noted that the phase structure (2) does not coexist with another phase structure having a continuous phase containing a polyolefin resin and a dispersed phase dispersed in the continuous phase.

Phase Structure (3): A phase structure having a continuous phase ($A_1$) containing a polyolefin resin, a dispersed phase ($B_{A1}$) dispersed in the continuous phase ($A_1$) and containing a polyamide resin, a continuous phase ($A_2$) containing a polyamide resin, and a dispersed phase ($B_{A2}$) dispersed in the continuous phase ($A_2$) and containing a modified elastomer (see FIG. 4).

Among these phase structures, the phase structure (1) or the phase structure (3) is preferred.

More specifically, the phase structure (1) can have a continuous phase (A) containing a polyolefin resin and a dispersed phase (B) dispersed in the continuous phase (A) and containing a polyamide resin, and the dispersed phase (B) may contain a modified elastomer in addition to the polyamide resin.

Figure 3:
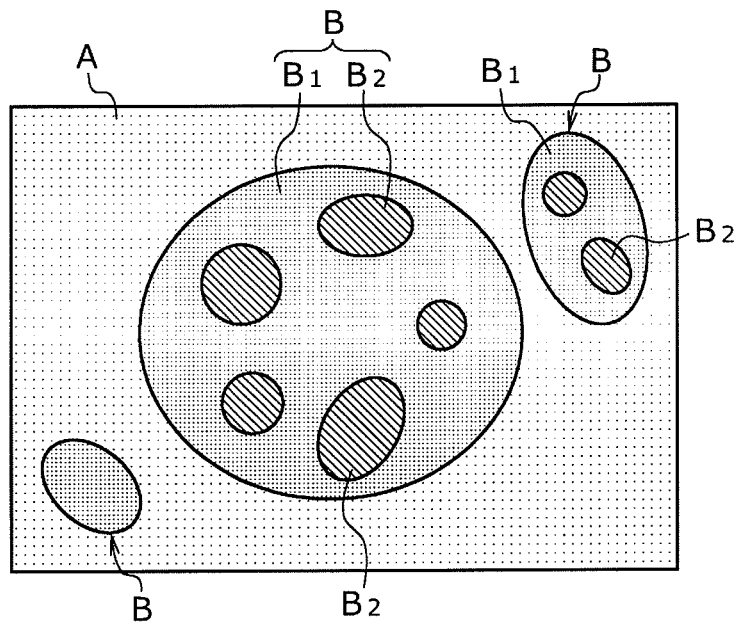
FIG. 3 is a schematic diagram explaining an example of a phase structure of a thermoplastic resin composition constituting a fiber-reinforced material or an article according to the present invention.

In addition, the dispersed phase (B) may have a continuous phase ($B_1$) that is present in the dispersed phase (B) and contains the polyamide resin and a fine dispersed phase ($B_2$) that is dispersed in the continuous phase ($B_1$) and contains the modified elastomer (see FIG. 3). In this case, the phase structure (1) is a multiple phase structure having a fine dispersed phase ($B_1$) further dispersed in the dispersed phase (B).

It is to be noted that the phase structure (1) does not have a continuous phase other than the continuous phase (A). Further, the modified elastomer present in the phase structure (1) may be a unreacted modified elastomer, a product obtained by reaction with the polyamide resin, or a mixture of them.

On the other hand, more specifically, the phase structure (3) can have a continuous phase ($A_1$) containing a polyolefin resin and a dispersed phase ($B_{A1}$) dispersed in the continuous phase ($A_1$) and containing a polyamide resin, and the dispersed phase ($B_{A1}$) may contain a modified elastomer in addition to the polyamide resin.

Figure 4:
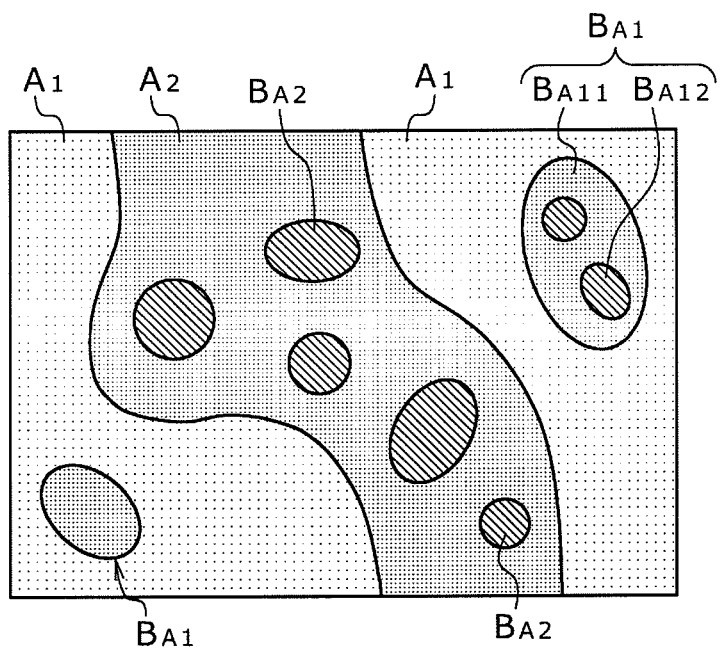
FIG. 4 is a schematic diagram explaining another example of a phase structure of a thermoplastic resin composition constituting a fiber-reinforced material or an article according to the present invention.

Further, the phase structure (3) can have, in addition to the continuous phase ($A_1$) and the dispersed phase ($B_{A1}$), a continuous phase ($A_2$) containing the polyamide resin and a dispersed phase ($B_{A2}$) dispersed in the continuous phase ($A_2$) and containing the modified elastomer (see FIG. 4). That is, the phase structure (3) can be a co-continuous phase structure in which two continuous phases, the continuous phase ($A_1$) and the continuous phase ($A_2$) coexist.

It is to be noted that among these phases, the dispersed phase ($B_{A1}$) may have a continuous phase ($B_{A11}$) that is present in the dispersed phase ($B_{A1}$) and contains the polyamide resin and a fine dispersed phase ($B_{A12}$) dispersed in the continuous phase ($B_{A11}$) and containing the modified elastomer. In this case, the phase structure (3) is a multiple phase structure having a fine dispersed phase ($B_{A12}$) further dispersed in the dispersed phase ($B_{A1}$).

The phase structure (3) does not have a continuous phase other than the continuous phase ($A_1$) and the continuous phase ($A_2$). The modified elastomer present in the phase structure (3) may be an unreacted modified elastomer, a product obtained by reaction with the polyamide resin, or a mixture of them.

In the case of the phase structure (1), the continuous phase (A) contains a polyolefin resin. The polyolefin resin is preferably a main component of the continuous phase (A) (the ratio of the polyolefin resin is usually 70% by mass or more and may be 100% by mass with respect to the total mass of the continuous phase (A)). The dispersed phase (B) contains a polyamide resin, and may further contain a modified elastomer. The polyamide resin (when the dispersed phase (B) contains a modified elastomer, the polyamide resin and the modified elastomer) is(are) preferably a main component of the dispersed phase (B) (the ratio of the polyamide resin (the polyamide resin and the modified elastomer) is usually 70% by mass or more or may be 100% by mass with respect to the total mass of the dispersed phase B).

Further, the dispersed phase (B) may have a continuous phase ($B_1$) present in the dispersed phase (B) and a fine dispersed phase ($B_2$) dispersed in the continuous phase ($B_1$). Among these phases, the continuous phase ($B_1$) contains the polyamide resin. The polyamide resin is preferably a main component of the continuous phase ($B_1$) (the ratio of the polyamide resin is usually 70% by mass or more and may be 100% by mass with respect to the total mass of the continuous phase $B_1$). The fine dispersed phase ($B_2$) contains the modified elastomer. The modified elastomer is preferably a main component of the fine dispersed phase ($B_2$) (the ratio of the modified elastomer is usually 70% by mass or more and may be 100% by mass with respect to the total mass of the fine dispersed phase $B_2$).

In the case of the phase structure (3), the continuous phase ($A_1$) contains a polyolefin resin. The polyolefin resin is preferably a main component of the continuous phase ($A_1$) (the ratio of the polyolefin resin is usually 70% by mass or more and may be 100% by mass with respect to the total mass of the continuous phase $A_1$). The dispersed phase ($B_{A1}$) dispersed in the continuous phase ($A_1$) contains a polyamide resin, and may further contain a modified elastomer. The polyamide resin (when the dispersed phase (B) contains a modified elastomer, the polyamide resin and the modified elastomer) is(are) preferably a main component of the dispersed phase ($B_{A1}$) (the ratio of the polyamide resin (the polyamide resin and the modified elastomer) is usually 70% by mass or more and may be 100% by mass with respect to the total mass of the dispersed phase $B_{A1}$).

Further, the dispersed phase ($B_{A1}$) may (or may not) have a continuous phase ($B_{A11}$) present in the dispersed phase ($B_{A1}$) and a fine dispersed phase ($B_{A12}$) dispersed in the continuous phase ($B_{A11}$). In the case of such a multiple phase structure, the continuous phase ($B_{A11}$) contains the polyamide resin. The polyamide resin is preferably a main component of the continuous phase ($B_{A11}$) (the ratio of the polyamide resin is usually 70% by mass or more and may be 100% by mass with respect to the total mass of the continuous phase $B_{A11}$). The fine dispersed phase ($B_{A12}$) contains the modified elastomer. The modified elastomer is preferably a main component of the fine dispersed phase ($B_{A12}$) (the ratio of the modified elastomer is usually 70% by mass or more and may be 100% by mass with respect to the total mass of the fine dispersed phase $B_{A12}$).

The continuous phase ($A_2$) contains the polyamide resin. The polyamide resin is preferably a main component of the continuous phase ($A_2$) (the ratio of the polyamide resin is usually 70% by mass or more and may be 100% by mass with respect to the total mass of the continuous phase $A_2$). The dispersed phase ($B_{A2}$) dispersed in the continuous phase ($A_2$) contains the modified elastomer. The modified elastomer is preferably a main component of the dispersed phase ($B_{A2}$)(the ratio of the modified elastomer is usually 70% by mass or more and may be 100% by mass with respect to the total mass of the dispersed phase $B_{A2}$).

When the thermoplastic resin composition has such a phase structure (1) or phase structure (3), the fiber-reinforced material according to the present invention can exhibit more excellent impact absorption capability. As will be described later, this phase structure can be obtained by melt-kneading a polyolefin resin and a melt-kneaded product of a polyamide resin and a modified elastomer.

It is to be noted that in the thermoplastic resin composition of the fiber-reinforced material according to the present invention, the modified elastomer may have reacted with the polyamide resin. That is, the modified elastomer may be a product obtained by reaction of the reactive group of the modified elastomer with the polyamide resin (a product obtained by reaction between the polyamide resin and the modified elastomer). For example, in the phase structure (1), the reaction product may be present at the interface between the continuous phase (A) and the dispersed phase (B) and/or the interface between the continuous phase ($B_1$) and the fine dispersed phase ($B_2$). Similarly, in the phase structure (3), the reaction product may be present at the interface between the continuous phase ($A_1$) and the continuous phase ($A_2$), the interface between the continuous phase ($A_1$) and the dispersed phase ($B_{A1}$), and the interface between the continuous phase ($B_{A11}$) and the fine dispersed phase ($B_{A12}$).

The various phase structures can be observed by observing the treated surface of a test specimen (a test specimen of the thermoplastic resin composition) subjected to oxygen plasma etching and then to osmium coating with a field-emission scanning electron microscope (FE-SEM). Particularly, the dispersed phase and the fine dispersed phase can be observed in an image enlarged 1000 times or more (usually 10,000 times or less) by such a method. The component constituting each of the phases can be identified by performing energy dispersive X ray spectrometry (EDS) during the observation using a field-emission scanning electron microscope (FE-SEM).

The size of the dispersed phase (the dispersed phase B shown in FIG. 3, the dispersed phase $B_{A1}$ shown in FIG. 4) of the thermoplastic resin composition is not particularly limited, but the dispersion diameter (average dispersion diameter) of the dispersed phase is preferably 10000 nm or less, more preferably 50 nm or more but 8000 nm or less, even more preferably 100 nm or more but 4000 nm or less.

The dispersion diameter of the dispersed phase can be measured in an electron microscope image enlarged 1000 times or more. More specifically, 20 particles of the dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the dispersed phase.

The size of the fine dispersed phase (the fine dispersed phase $B_2$ shown in FIG. 3, the fine dispersed phase $B_{412}$ shown in FIG. 4) contained in the dispersed phase (the dispersed phase B shown in FIG. 3, the dispersed phase $B_{41}$ shown in FIG. 4) of the thermoplastic resin composition is not particularly limited, but the dispersion diameter (average dispersion diameter) of the fine dispersed phase is preferably 5 nm or more but 1000 nm or less, more preferably 5 nm or more but 600 nm or less, even more preferably 10 nm or more but 400 nm or less, particularly preferably 15 nm or more but 350 nm or less.

The dispersion diameter of the fine dispersed phase can be measured in an electron microscope image enlarged 1000 times or more. More specifically, 20 particles of the fine dispersed phase are randomly selected in a predetermined area in the image, the largest diameter of each of the particles is measured, and an average of the largest diameters is determined as a first average. Then, first averages measured in 5 different areas in the image are further averaged to determine an average dispersion diameter (major-axis average dispersion diameter) of the fine dispersed phase.

<4> Blending

When the total of the polyolefin resin, the polyamide resin, and the modified elastomer contained in the thermoplastic resin composition is taken as 100% by mass, the ratio of the polyolefin resin may be 2% by mass or more but 90% by mass or less. The ratio of the polyolefin resin is preferably 5% by mass or more but 85% by mass or less, more preferably 10% by mass or more but 83% by mass or less, even more preferably 15% by mass or more but 80% by mass or less, even more preferably 20% by mass or more but 78% by mass or less, even more preferably 25% by mass or more but 75% by mass or less, even more preferably 30% by mass or more but 73% by mass or less, even more preferably 35% by mass or more but 70% by mass or less. When the ratio of the polyolefin resin is within the above range, a fiber-reinforced material having excellent impact absorption properties and an article using the fiber-reinforced material can be obtained.

When the total of the polyolefin resin, the polyamide resin, and the modified elastomer contained in the thermoplastic resin composition is taken as 100% by mass, the ratio of the polyamide resin and the modified elastomer (part or all of them may be reacted with each other, the same applies hereinafter) may be 10% by mass or more but 98% by mass or less. The ratio of the polyamide resin and the modified elastomer is preferably 15% by mass or more but 95% by mass or less, more preferably 17% by mass or more but 90% by mass or less, even more preferably 20% by mass or more but 85% by mass or less, even more preferably 22% by mass or more but 80% by mass or less, even more preferably 25% by mass or more but 75% by mass or less, even more preferably 27% by mass or more but 70% by mass or less, even more preferably 30% by mass or more but 65% by mass or less. When the ratio of the polyolefin resin is within the above range, a fiber-reinforced material having excellent impact absorption properties and an article using the fiber-reinforced material can be obtained.

When the total of the polyolefin resin, the polyamide resin, and the modified elastomer contained in the thermoplastic resin composition is taken as 100% by mass, the ratio of the polyamide resin may be 1% by mass or more but 75% by mass or less. The ratio of the polyamide resin is preferably 15% by mass or more but 72% by mass or less, more preferably 20% by mass or more but 70% by mass or less, even more preferably 22% by mass or more but 68% by mass or less, even more preferably 25% by mass or more but 65% by mass or less, even more preferably 27% by mass or more but 57% by mass or less, even more preferably 29% by mass or more but 53% by mass or less, even more preferably 33% by mass or more but 49% by mass or less. When the ratio of the polyolefin resin is within the above range, a fiber-reinforced material having excellent impact absorption properties and an article using the fiber-reinforced material can be obtained.

When the total of the polyolefin resin, the polyamide resin, and the modified elastomer contained in the thermoplastic resin composition is taken as 100% by mass, the ratio of the modified elastomer may be 1% by mass or more but 60% by mass or less. The ratio of the modified elastomer is preferably 5% by mass or more but 53% by mass or less, more preferably 11% by mass or more but 45% by mass or less, even more preferably 12% by mass or more but 40% by mass or less, even more preferably 13% by mass or more but 38% by mass or less, even more preferably 14% by mass or more but 36% by mass or less, even more preferably 15% by mass or more but 35% by mass or less, even more preferably 18% by mass or more but 34% by mass or less. When the ratio of the polyolefin resin is within the above range, a fiber-reinforced material having excellent impact absorption properties and an article using the fiber-reinforced material can be obtained.

When the total of the polyamide resin and the polyamide resin contained in the thermoplastic resin composition is taken as 100% by mass, the ratio of the polyamide resin may be 1.5% by mass or more but 88% by mass or less. The ratio of the polyamide resin is preferably 3% by mass or more but 75% by mass or less, more preferably 5% by mass or more but 70% by mass or less, even more preferably 10% by mass or more but 65% by mass or less, even more preferably 15% by mass or more but 60% by mass or less, even more preferably 18% by mass or more but 55% by mass or less, even more preferably 20% by mass or more but 50% by mass or less, even more preferably 25% by mass or more but 45% by mass or less. When the ratio of the polyolefin resin is within the above range, a fiber-reinforced material having excellent impact absorption properties and an article using the fiber-reinforced material can be obtained.

When the total of the polyamide resin and the modified elastomer contained in the thermoplastic resin composition is taken as 100% by mass, the ratio of the modified elastomer may be 20% by mass or more but 90% by mass or less. The ratio of the modified elastomer is preferably 22% by mass or more but 88% by mass or less, more preferably 25% by mass or more but 86% by mass or less, even more preferably 27% by mass or more but 75% by mass or less, even more preferably 29% by mass or more but 70% by mass or less, even more preferably 32% by mass or more but 66% by mass or less, even more preferably 36% by mass or more but 60% by mass or less. When the ratio of the polyolefin resin is within the above range, a fiber-reinforced material having excellent impact absorption properties and an article using the fiber-reinforced material can be obtained.

It is to be noted that in the case of the phase structure (1) (see FIG. 3), the ratio of the polyolefin resin when the total of the polyolefin resin, the polyamide resin, and the modified elastomer is taken as 100% by mass is usually equal to the ratio of the continuous phase (A) when the total mass of the phases of the phase structure (1) is taken as 100%. On the other hand, in the case of the phase structure (3) (see FIG. 4), the ratio of the polyolefin resin when the total of the polyolefin resin, the polyamide resin, and the modified elastomer is taken as 100% by mass is usually equal to the ratio of the continuous phase ($A_1$) when the total mass of the phases of the phase structure (3) is taken as 100%. The ratio mentioned herein refers to a volume ratio, and is usually also equal to an area ratio reflecting the volume ratio (the same applies hereinafter).

In the case of the phase structure (1) (see FIG. 3), the ratio of the polyamide resin and the modified elastomer when the total of the polyolefin resin, the polyamide resin, and the modified elastomer is taken as 100% by mass is usually equal to the ratio of the dispersed phase (B) when the total mass of the phases of the phase structure (1) is taken as 100%. On the other hand, in the case of the phase structure (3) (see FIG. 4), the ratio of the polyamide resin and the modified elastomer when the total of the polyolefin resin, the polyamide resin, and the modified elastomer is taken as 100% by mass is usually equal to the total ratio of the dispersed phase ($B_{A1}$), the continuous phase ($A_2$), and the dispersed phase ($B_{A2}$) when the total mass of the phases of the phase structure (3) is taken as 100%.

In the case of the phase structure (1) (see FIG. 3), the ratio of the polyamide resin when the total of the polyolefin resin, the polyamide resin, and the modified elastomer is taken as 100% by mass is usually equal to the ratio of the continuous phase ($B_1$) when the total mass of the phases of the phase structure (1) is taken as 100%. On the other hand, in the case of the phase structure (3) (see FIG. 4), the ratio of the polyamide resin when the total of the polyolefin resin, the polyamide resin, and the modified elastomer is taken as 100% by mass is usually equal to the total ratio of the continuous phase ($A_2$) and the continuous phase ($B_{A11}$) present in the dispersed phase when the total mass of the phases of the phase structure (3) is taken as 100%.

In the case of the phase structure (1) (see FIG. 3), the ratio of the modified elastomer when the total of the polyolefin resin, the polyamide resin, and the modified elastomer is taken as 100% by mass is usually equal to the ratio of the fine dispersed phase ($B_2$) when the total mass of the phases of the phase structure (1) is taken as 100%. On the other hand, in the case of the phase structure (3) (see FIG. 4), the ratio of the modified elastomer when the total of the polyolefin resin, the polyamide resin, and the modified elastomer is taken as 100% by mass is usually equal to the total ratio of the fine dispersed phase ($B_{A12}$) and the dispersed phase ($B_{A2}$) when the total mass of the phases of the phase structure (3) is taken as 100%.

In the case of the phase structure (1) (see FIG. 3), the ratio of the polyamide resin when the total of the polyolefin resin and the polyamide resin is taken as 100% by mass is usually equal to the ratio of the continuous phase ($B_1$) when the total mass of the phases of the phase structure (1) is taken as 100%. On the other hand, in the case of the phase structure (3) (see FIG. 4), the ratio of the polyamide resin when the total of the polyolefin resin and the polyamide resin is taken as 100% by mass is usually equal to the total ratio of the continuous phase ($A_2$), the dispersed phase ($B_{A1}$) not having the fine dispersed phase ($B_{A12}$), and the continuous phase ($B_{A11}$) in the dispersed phase ($B_{A1}$) having the fine dispersed phase ($B_{A12}$) when the total mass of the phases of the phase structure (3) is taken as 100%.

In the case of the phase structure (1) (see FIG. 3), the ratio of the modified elastomer when the total of the polyamide resin and the modified elastomer is taken as 100% by mass is usually equal to the ratio of the fine dispersed phase ($B_2$) when the total mass of the phases of the phase structure (1) is taken as 100%. On the other hand, in the case of the phase structure (3) (see FIG. 4), the ratio of the modified elastomer when the total of the polyamide resin and the modified elastomer is taken as 100% by mass is usually equal to the total ratio of the dispersed phase ($B_{A2}$) and the fine dispersed phase ($B_{A12}$) when the total mass of the phases of the phase structure (3) is taken as 100%.

<5> Impact Absorption Properties

The fiber-reinforced material according to the present invention and an article according to the present invention that will be described later can exhibit excellent impact absorption properties. More specifically, when a puncture test is performed at a striker speed of 1 msec or more but 4 msec or less, and when a deflection (mm) when a maximum impact force (N) is applied is defined as $P_M$ and a deflection (mm) at break is defined as $P_B$, $P_M$ and $P_B$ satisfy $P_B/P_M \geq 4$ (usually, $P_B/P_M \leq 10$).

This means that the deflection after the occurrence of cracking and before break is four times or more larger than that before the occurrence of cracking caused by the input of an impact. Therefore, the fiber-reinforced material and the structure according to the present invention can absorb energy before the occurrence of cracking, and also can absorb a large amount of energy during the development of cracking, which makes it possible to increase the total amount of energy absorbed before break and to exhibit more excellent impact absorption capability. That is, the fiber-reinforced material and the structure according to the present invention can be said to be materials that are harder to break. In general, materials can absorb impact when they are broken, but their impact absorption capability sharply reduces after break. Therefore, materials are designed so as to be able to absorb a larger amount of energy before the occurrence of cracking to increase their total amount of absorbed energy. From this viewpoint, materials need to be designed to be longer, larger, and heavier by, for example, an increase in thickness. However, the fiber-reinforced material and the article according to the present invention can achieve a larger total amount of absorbed energy even when designed to be thinner, lighter, and smaller.

The above-described value $P_B/P_M$ may further satisfy $4 \leq P_B/P_M \leq 10$, may further satisfy $4.5 \leq P_B/P_M \leq 9.8$, may further satisfy $5.0 \leq P_B/P_M \leq 9.6$, or may further satisfy $5.5 \leq P_B/P_M \leq 9.4$.

Further, when, in the above-described puncture test, the amount of energy (Nmm) absorbed before a maximum impact force (N) is applied is defined as $E_1$, the amount of energy (Nmm) absorbed after a maximum impact force (N) is applied and before break is defined as $E_2$, and the total of the amount of energy $E_1$ and the amount of energy $E_2$, that is, the total amount of absorbed energy (Nmm) is defined as $E_T$, the ratio of $E_2$ to $E_T$ ($E_2/E_T$) may be 70% or more.

This means that the ratio of the amount of energy $E_2$ (Nmm) absorbed after a maximum impact force (N) is applied and before break to the total absorbed energy is 70% or more (usually, 90% or less). That is, the amount of energy absorbed after the occurrence of cracking caused by the input of an impact and before break is 2.3 times or more the amount of energy absorbed before the occurrence of cracking. As described above, the fiber-reinforced material and the article according to the present invention can absorb a large amount of energy during the development of cracking, and therefore can exhibit excellent impact absorption capability before break.

The above-described value $E_2/E_T$ may further satisfy $70 \leq E_2/E_T(\%) \leq 90$ or may further satisfy $70.5 \leq E_2/E_T(\%) \leq 88$.

Particularly, when the fiber-reinforced material and the article according to the present invention are subjected to a puncture test at a striker speed of 4 msec (i.e., when a high-speed impact is input), the value $E_2/E_T$ may further satisfy $72 \leq E_2/E_T(\%) \leq 87$, may further satisfy $74 \leq E_2/E_T(\%) \leq 86$, or may further satisfy $76 \leq E_2/E_T(\%) \leq 85$.

It is to be noted that the above-described puncture test is performed in accordance with JIS K 7211-2. A test specimen (fiber-reinforced material 10) used in the puncture test is a fiber-reinforced material 10 (thickness: 0.5 to 0.8 mm) obtained using a carbon fiber woven fabric having a mass per unit area of 200 g/m² as a fiber assembly 15 and a thermoplastic resin composition having a mass per unit area of 600 g/m² as a matrix material 12. The test is performed by horizontally fixing the test specimen to a predetermined chuck of a puncture tester and vertically releasing a round bar-shaped striker (load capacity: 20 kN) having a diameter of ½ inches (12.7 mm) and a hemispherical tip from above the test specimen at a striker speed of 1 msec or more but 4 msec or less. Then, an impact force (N) applied in this test and a deflection (mm) caused by the input of the impact force are recorded to calculate the above-described parameters (more specifically, the test is performed under conditions described later in Examples).

[2] Article

An article (50) according to the present invention is made of the above-described fiber-reinforced material (10) according to the present invention. That is, the article 50 according to the present invention can be said to be a shaped article of the fiber-reinforced material 10. Specific examples of the article 50 according to the present invention include one obtained by forming the fiber-reinforced material 10 into a predetermined shape (including a flat plate shape) and one obtained by cutting unnecessary peripheral portions of the fiber-reinforced material 10.

The shape, size, thickness, etc. of the article 50 according to the present invention are not particularly limited, and the application of the article 50 according to the present invention is not particularly limited, either. This article can be used as, for example, an exterior material, an interior material, a structural material (body shell, car body, fuselage), and an impact absorber for automobiles, railway vehicles, boats and ships, and airplanes. Examples of the automotive materials include automotive exterior materials, automotive interior materials, automotive structural materials, automotive impact absorbers, and engine room parts. Specific examples of the automotive materials include bumpers, spoilers, cowlings, front grilles, garnishes, hoods, trunk lids, cowl louvers, fender panels, rocker moldings, door panels, roof panels, instrument panels, center clusters, door trims, quarter trims, roof linings, pillar garnishes, deck trims, tonneau boards, package trays, dashboards, console boxes, kicking plates, switch bases, seat backboards, seat frames, armrests, sun visors, intake manifolds, energy absorbers such as engine head covers, engine under covers, oil filter housings, housings for car electronic parts (e.g., ECUs and TV monitors), air filter boxes, and rush boxes, and body shell constituent parts such as front end modules.

The article 50 according to the present invention can also be used as, for example, an interior material, an exterior material, and a structural material for buildings and furniture. Specific examples thereof include door covering materials, door structural materials, covering materials and structural materials for furniture (e.g., desks, chairs, shelves, chests of drawers), modular bathrooms, and septic tanks.

The article 50 according to the present invention can also be used as, for example, a package, a container (e.g., a tray), a protective member, and a partition member. Further, the article 50 according to the present invention can also be used as a molded body such as a housing or a structural body for home appliances (e.g., flat TVs, refrigerators, washing machines, cleaners, mobile phones, portable game machines, notebook-size personal computers).

When the fiber 15 is staple fiber, the fiber-reinforced material according to the present invention may be a pellet in which the staple fiber is contained in the matrix material. In this case, a method for producing the fiber-reinforced material according to the present invention is not limited. For example, the pellet can be obtained by mixing a thermoplastic resin composition as a matrix material 12 and fiber 15 and then pelletizing the mixture. Alternatively, fiber 15 may be added when a thermoplastic resin composition is prepared. For example, the pellet can be obtained by melt-kneading a polyolefin resin containing fiber 15 and a melt-kneaded product of a polyamide resin and a modified elastomer to obtain a composition and then pelletizing the composition.

[3] Method for Producing Fiber-Reinforced Material and Article

A method for producing the fiber-reinforced material and the article according to the present invention is not limited, but may be, for example, any one of the following methods (1) to (7).

(1) The fiber-reinforced material and the article according to the present invention can be produced by molding a thermoplastic resin composition containing fiber (staple fiber). More specifically, the fiber-reinforced material and the article according to the present invention can be produced by, for example, molding the above-described pellets (pellets for injection molding) in which staple fiber is contained in a matrix material. At this time, molding can be performed using a known method. Examples of the molding method include injection molding, extrusion molding, blow molding, and a combination of two or more of them.

(2) The fiber-reinforced material and the article according to the present invention can be produced by thermally compressing a laminate of a fiber assembly (which is in the form of, for example, film, sheet, mat, or plate) and a film made of a thermoplastic resin composition (which may be in the form of sheet) to impregnate the inside of the fiber assembly with the softened or melted thermoplastic resin composition and then cooling the laminate (or allowing the laminate to cool) to solidify the thermoplastic resin composition.

It is to be noted that the laminate may be prepared by laminating one fiber assembly layer and one thermoplastic resin composition film layer or sandwiching one fiber assembly layer between two thermoplastic resin composition film layers. The obtained plate-shaped article may further be thermally formed into a more complicated shape.

(3) The fiber-reinforced material and the article according to the present invention can be produced by sprinkling a powder made of a thermoplastic resin composition onto one surface (usually, top surface) of a fiber assembly (which is in the form of, for example, film, sheet, mat, or plate), then thermally compressing the fiber assembly to soften or melt the thermoplastic resin composition in the fiber assembly, and then cooling the fiber assembly (or allowing the fiber assembly to cool) to solidify the thermoplastic resin composition in the fiber assembly.

It is to be noted that the fiber assembly may be vibrated so that the powder is more easily dispersed in the fiber assembly. Also in this case, the obtained plate-shaped article may be thermally formed into a more complicated shape.

(4) The fiber-reinforced material and the article according to the present invention can be produced by mixing fiber that will constitute a fiber assembly and thermoplastic resin composition fiber obtained by forming a thermoplastic resin composition into fiber, forming the fiber mixture into a mat (for example, the fiber mixture is deposited by, for example, air-laying to form a mat), then thermally compressing the mat to soften or melt only the thermoplastic resin composition fiber, and then cooling the mat (or allowing the mat to cool) to solidify the thermoplastic resin composition.

Also in this case, the obtained plate-shaped article may be thermally formed into a more complicated shape.

(5) The fiber-reinforced material and the article according to the present invention can be produced by dispersing, in a liquid, fiber that will constitute a fiber assembly and thermoplastic resin composition fiber obtained by forming a thermoplastic resin composition into fiber, then forming a mat from the constituent fiber and the thermoplastic resin composition fiber dispersed in the dispersion liquid by a papermaking method, then thermally compressing the mat to soften or melt only the thermoplastic resin composition fiber, and then cooling the mat (or allowing the mat to cool) to solidify the thermoplastic resin composition.

Also in this case, the obtained plate-shaped article may be thermally formed into a more complicated shape.

(6) The fiber-reinforced material and the article according to the present invention can be produced by forming a desired fiber assembly using core-sheath fiber obtained by coating the surface of fiber that will constitute a fiber assembly with a thermoplastic resin composition (that is, the constituent fiber serves as a core material and the thermoplastic resin composition serves as a sheath material), then thermally compressing the fiber assembly to soften or melt only the sheath material (thermoplastic resin composition), and then cooling the fiber assembly (or allowing the fiber assembly to cool) to solidify the thermoplastic resin composition.

It is to be noted that examples of the fiber assembly formed using core-sheath fiber include a woven fabric, a knit fabric, and a non-woven fabric obtained by weaving, knitting, and non-woven process (for example, the core-sheath fiber is deposited by, for example, air-laying to form a mat). Also in this case, the obtained plate-shaped article may be thermally formed into a more complicated shape.

(7) The fiber-reinforced material and the article according to the present invention can be produced by spraying a liquid thermoplastic resin composition onto fiber assemblies (e.g., fiber assemblies obtained by arranging fibers (long fibers) in parallel in a unidirection or fiber assemblies as woven fabrics obtained by weaving fibers) and then laminating the fiber assemblies with the liquid resin composition attached thereto or forming the fiber assemblies into a desired shape (Tape Laying System) while laminating the fiber assemblies with the liquid resin composition attached thereto.

The thermoplastic resin used in the present invention can be prepared by any method, but may be obtained by melt-kneading a melt-kneaded product of a polyamide resin and a modified elastomer and a polyolefin resin. More specifically, the thermoplastic resin composition is preferably obtained by previously melt-kneading a polyamide resin and a modified elastomer to obtain a melt-kneaded product separately from a polyolefin resin and then melt-kneading the melt-kneaded product and the polyolefin resin.

It is considered that by preparing a melt-kneaded product of a polyamide resin and a modified elastomer in this way, the reactive group of the modified elastomer is attached to the surface of the polyamide resin so that polyamide resin particles having the reacted modified elastomer bound thereto are formed. The polyamide resin particles having the reacted modified elastomer bound to the surfaces thereof are sheared by further kneading so that unreacted surfaces of the polyamide resin appear. Then, the unreacted modified elastomer is considered to further react with the unreacted surfaces. It is considered that as described above, the repetition of shearing of polyamide resin particles having the reacted modified elastomer bound thereto, appearance of unreacted surfaces of the polyamide resin, and reaction of the unreacted modified elastomer with the unreacted surfaces makes it possible to stably form smaller polyamide resin particles having the reacted modified elastomer bound thereto without using a high shearing force.

It is to be noted that the above-described melt-kneaded product may be a composition in a molten state, a composition in a softened state, or a composition solidified by pelletization or the like.

The preparation of the melt-kneaded product and the melt-kneading of the melt-kneaded product and the polyolefin resin may be performed using any melt-kneading device. Examples of the melt-kneading device include an extruder (e.g., a single-screw extruder, a twin-screw kneading extruder), a kneader, and a mixer (e.g., a high-speed flow mixer, a paddle mixer, a ribbon mixer). These devices may be used singly or in combination of two or more of them. When two or more devices are used, they may be operated either continuously or batch-wise. Further, all the raw materials may be mixed at a time or may be mixed by adding them in several batches (multistage addition).

The melt-kneading temperature of the polyamide resin and the modified elastomer is not limited, but is, for example, preferably 190° C. or higher but 350° C. or lower, more preferably 200° C. or higher but 330° C. or lower, even more preferably 205° C. or higher but 310° C. or lower.

On the other hand, the melt-kneading temperature of the melt-kneaded product of the polyamide resin and the modified elastomer and the polyolefin resin is not limited, but is, for example, preferably 190° C. or higher but 350° C. or lower, more preferably 200° C. or higher but 300° C. or lower, even more preferably 205° C. or higher but 260° C. or lower.

EXAMPLES

Hereinbelow, the present invention will be specifically described with reference to examples.

[1] Production of Fiber-Reinforced Material

<1> Fiber-Reinforced Material of Example 1

(1) Preparation of Thermoplastic Resin Composition Film
Pellets of the following polyamide resin and pellets of the following modified elastomer were dry-blended, then fed into a twin-screw melt-kneading extruder, and melt-kneaded at a kneading temperature of 210° C. The thus obtained melt-kneaded product of the polyamide resin and the modified elastomer was pelletized by a pelletizer to obtain pellets of the melt-kneaded product. Further, the pellets (pellets of the melt-kneaded product of the polyamide resin and the modified elastomer) and pellets of the following polyolefin resin were dry-blended, then fed into a twin-screw melt-kneading extruder, and melt-kneaded at a kneading temperature of 210° C., and extruded through a T-die extruder to obtain a film made of a thermoplastic resin composition having a mass per unit area of 300 g/m$^2$.

It is to be noted that the polyolefin resin, the polyamide resin, and the modified elastomer were blended in a mass ratio of 55:25:20.

Polyolefin resin: polypropylene resin, homopolymer, manufactured by Japan Polypropylene Corporation, product name: "NOVATEC MA1B", weight-average molecular weight: 312,000, melting point: 165° C.

Polyamide resin: nylon 11 resin, manufactured by Arkema, product name: "Rilsan BMN O", weight-average molecular weight: 18,000, melting point: 190° C.

Modified elastomer: maleic anhydride-modified ethylene-butene copolymer (modified EBR), manufactured by Mitsui Chemicals, Inc., product name: "TAFMER MH7020"

(2) Production of Fiber-Reinforced Material

As a fiber assembly (15), a carbon fiber woven fabric was prepared which was produced by plainly weaving carbon fibers (3K: multifilaments each consisting of 3000 monofilaments) and had a mass per unit area of 200 g/m$^2$.

One sheet of the fiber assembly was sandwiched between one sheet of the thermoplastic resin composition film obtained above in (1) as an upper layer and one sheet of the thermoplastic resin composition film obtained above in (1) as a lower layer, and these sheets were subjected to thermal compression for 120 seconds under conditions of a temperature of 240° C. and a compression pressure of 1×10$^7$ N/m$^2$ and were then further subjected to cold compression for 120 seconds under conditions of room temperature (about 25° C.) and a compression pressure of 5×10$^6$ N/m$^2$ to obtain a fiber-reinforced material of Example 1 (i.e., a plate-shaped article) (thickness: 0.6 mm).

<2> Fiber-Reinforced Material of Comparative Example 1

(1) Preparation of Polyolefin Resin Film

The following polyolefin resin was formed into a film having a mass per unit area of 300 g/m$^2$ using a T-die extruder.

Polyolefin resin: polypropylene resin, block polymer, manufactured by Prime Polymer Co., Ltd., product name: "J-452 HP", melting point: 165° C.

(2) Production of Fiber-Reinforced Material

As in the case of Example 1 described above in <1> (2), a carbon fiber woven fabric (3K multifilaments, plain weave) having a mass per unit area of 200 g/m$^2$ was prepared as a fiber assembly (15). Then, one sheet of the fiber assembly was sandwiched between one sheet of the polyolefin resin film obtained above in (1) as an upper layer and one sheet of the polyolefin resin film obtained above in (1) as a lower layer, and these sheets were subjected to thermal compression for 120 seconds under conditions of a temperature of 240° C. and a compression pressure of 1×10$^7$ N/m$^2$ and were then further subjected to cold compression for 120 seconds under conditions of room temperature (about 25° C.) and a compression pressure of 5×10$^6$ N/m$^2$ to obtain a fiber-reinforced material of Comparative Example 1 (thickness: 0.6 mm).

<3> Fiber-Reinforced Material of Comparative Example 2

(1) Preparation of Polyamide Resin Film

The following polyamide resin was formed into a film having a mass per unit area of 300 g/m$^2$ using a T-die extruder.

Polyamide resin: nylon 6 resin, manufactured by Toray Industries, Inc., product name: "Amilan CM1021FS", melting point: 225° C.

(2) Production of Fiber-Reinforced Material

As in the case of Example 1 described above in <1> (2), a carbon fiber woven fabric (3K multifilaments, plain weave) having a mass per unit area of 200 g/m$^2$ was prepared as a fiber assembly (15). Then, one sheet of the fiber assembly was sandwiched between one sheet of the polyamide resin film obtained above in (1) as an upper layer and one sheet of the polyamide resin film obtained above in (1) as a lower layer, and these sheets were subjected to thermal compression for 120 seconds under conditions of a temperature of 260° C. and a compression pressure of 1×10$^7$ N/m$^2$ and were then further subjected to cold compression for 120 seconds under conditions of room temperature (about 25° C.) and a compression pressure of 5×10$^6$ N/m$^2$ to obtain a fiber-reinforced material of Comparative Example 2 (thickness: 0.6 mm).

[2] Evaluation of Fiber-Reinforced Materials (1) Puncture Test (Striker Speed: 1 m/sec)

A puncture test was performed in accordance with JIS K 7211-2. As a test specimen (fiber-reinforced material), a sample (120 mm×150 mm) cut out from each of the fiber-reinforced materials of Example 1, Comparative Example 1, and Comparative Example 2 obtained above in [1] was used.

Specifically, each of the samples was horizontally fixed to a chuck of a puncture tester (manufactured by Shimadzu Corporation, high-speed impact tester, Model "EHF-22H-20L"), a round bar-shaped striker (load capacity: 20 kN) having a diameter of ½ inches (12.7 mm) and a hemispherical tip were vertically released from above the sample at a striker speed of 1 m/sec, and an impact force (N) applied at this time and a deflection (mm) caused by the impact force were recorded. The results are shown as charts in FIG. 5.

(2) Puncture Test (Striker Speed: 4 m/sec)

An impact force (N) and a deflection (mm) caused by the impact force were recorded in the same manner as described above in (1) except that the striker speed was changed to 4 m/sec. The results are shown as charts in FIG. 6.

(3) Evaluation Method

In the charts obtained by the puncture test described above in (1) and (2), the following $P_M$, $P_B$, $E_1$, $E_2$, and $E_T$ were set.

"$P_M$ (mm)": A deflection (mm) at the time when a maximum impact force (N) was achieved in each of the tests was defined as $P_M$ and shown in the charts of FIGS. 5 and 6 obtained above in (1). It is considered that cracking occurs when the maximum impact force (N) is achieved.

"$P_B$ (mm)": A deflection (mm) equal to or larger than 2 mm just before an impact force (N) became 0 N or less was defined as a deflection at break $P_B$ and shown in the charts of FIGS. 5 and 6 obtained above in (1). It is considered that cracking develops from the point of $P_M$ to the point of $P_B$.

"$E_1$ (Nmm)": A region positioned on the left of a line segment $L_E$ drawn in parallel with a Y axis so as to pass through $P_M$ (see a left-hand dotted line $L_E$ in FIGS. 5 and 6) (region where a deflection was smaller) was defined as $E_1$ and shown in the charts of FIGS. 5 and 6 obtained above in (1). Further, the area of the region $E_1$ was calculated and shown in FIGS. 5 and 6.

"$E_2$ (Nmm)": A region positioned on the right of a line segment $L_E$ drawn in parallel with a Y axis so as to pass through $P_M$ (see a left-hand dotted line $L_E$ in FIGS. 5 and 6) (region where a deflection was larger) was defined as $E_2$ and shown in the charts of FIGS. 5 and 6 obtained above in (1). Further, the area of the region $E_2$ was calculated and shown in FIGS. 5 and 6.

"$E_T$ (Nmm)": A total area of the area of the region $E_1$ and the area of the region $E_2$ was defined as $E_T$ and shown in FIGS. 5 and 6.

Figure 5:
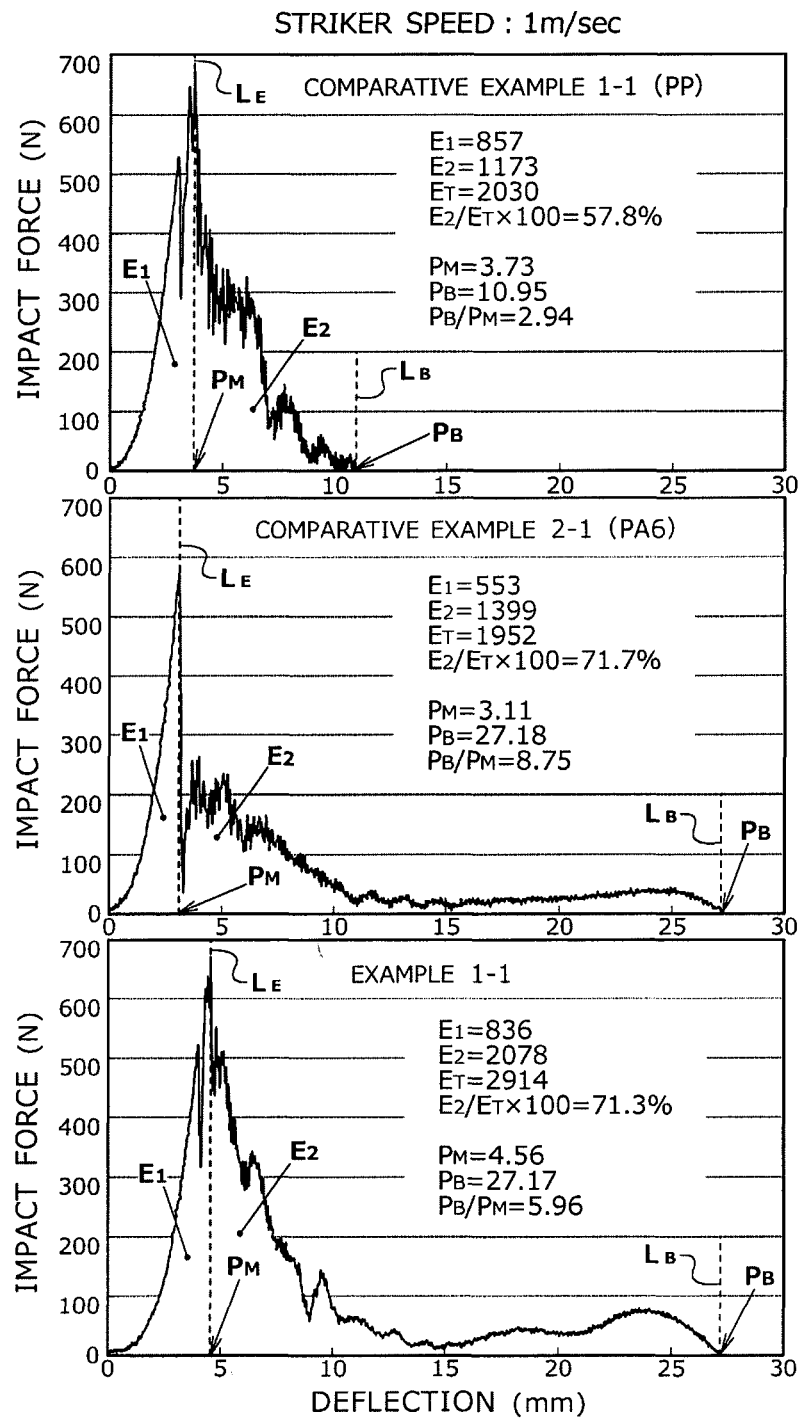
FIG. 5 shows graphs each obtained by plotting a correlation between impact force and deflection obtained by subjecting each of test specimens of Example and Comparative Examples to a puncture test (striker speed: 1 m/sec).
Figure 6:
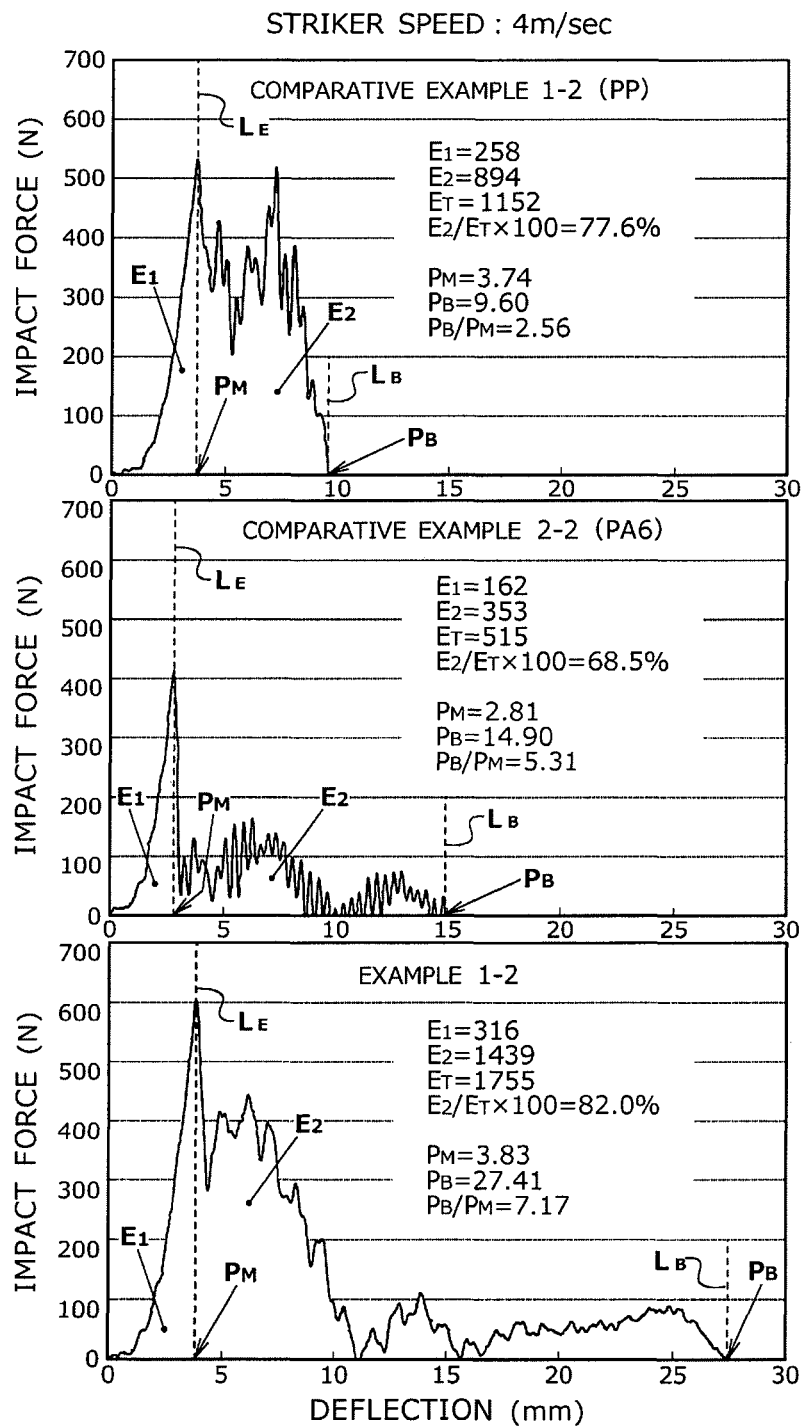
FIG. 6 shows graphs each obtained by plotting a correlation between impact force and deflection obtained by subjecting each of test specimens of Example and Comparative Examples to a puncture test (striker speed: 4 m/sec).

It is to be noted that in FIGS. 5 and 6, a line segment $L_B$ (see a right-hand dotted line $L_B$ in FIGS. 5 and 6) is a line segment that passes through $P_B$ and is parallel to a Y axis.

[3] Effects of Examples

As can be seen from FIGS. 5 and 6, in the case of Comparative Example 1 using a polyolefin resin as a matrix material 12, $P_B/P_M=2.94$ in Comparative Example 1-1 (striker speed: 1 m/sec), and $P_B/P_M=2.56$ in Comparative Example 1-2 (striker speed: 4 m/sec). This indicates that the ratio of the deflection during the development of cracking to the deflection before the occurrence of cracking is small.

Further, in the case of Comparative Example 2 using a polyamide resin as a matrix material 12, $P_B/P_M=8.75$ in Comparative Example 2-1 (striker speed: 1 m/sec), and $P_B/P_M=5.31$ in Comparative Example 2-2 (striker speed: 4 m/sec). This indicates that the ratio of the deflection during development of cracking to the deflection before the occurrence of cracking is large. However, it can be seen that $P_B/P_M$ is large when the striker speed is 1 m/sec, but reduces when the striker speed is 4 m/sec. Further, $P_M$ is 2.81 at a striker speed of 4 m/sec, which indicates that the deflection before the occurrence of cracking is small. This reveals that the polyamide resin can exhibit high impact absorption capability when an impact is input at a low speed, but its impact absorption capability tends to reduce when an impact is input at a higher speed.

On the other hand, in the case of Example 1 using a predetermined thermoplastic resin composition as a matrix material 12, $P_B/P_M=5.96$ in Example 1-1 (striker speed: 1 m/sec), and $P_B/P_M=7.17$ in Example 1-2 (striker speed: 4 m/sec). Further, $P_M=4.56$ in Example 1-1 and $P_M=3.83$ in Example 1-2, which indicates that the deflection before the occurrence of cracking is large irrespective of the striker speed. This reveals that the use of a predetermined thermoplastic resin composition makes it possible to exhibit high impact absorption capability irrespective of whether the speed of an input impact is low or high. It can be considered that this result indicates that fracture that occurred in Example 1-1 and Example 1-2 is ductile fracture.

Further, as can be seen from FIGS. 5 and 6, in the case of Comparative Example 1 using a polyolefin resin as a matrix material 12, $E_2/E_T \times 100 = 57.8\%$ in Comparative Example 1-1 (striker speed: 1 m/sec), and $E_2/E_T \times 100 = 77.6\%$ in Comparative Example 1-2 (striker speed: 4 m/sec). This indicates that the ratio of the amount of energy absorbable during the development of cracking to the deflection before the occurrence of cracking is small.

Further, in the case of Comparative Example 2 using a polyamide resin as a matrix material 12, $E_2/E_T \times 100 = 71.7\%$ in Comparative Example 2-1 (striker speed: 1 m/sec), and $E_2/E_T \times 100 = 68.5\%$ in Comparative Example 2-2 (striker speed: 4 m/sec). This indicates that the ratio of the amount of energy absorbable during the development of cracking to the deflection before the occurrence of cracking is large. However, it can be seen that the ratio of $E_2/E_T$ is large when the striker speed is 1 m/sec, but reduces when the striker speed is 4 m/sec.

On the other hand, in the case of Example 1 using a predetermined thermoplastic resin composition as a matrix material 12, $E_2/E_T \times 100 = 71.3\%$ in Example 1-1 (striker speed: 1 m/sec) and $E_2/E_T \times 100 = 82.0\%$ in Example 1-2 (striker speed: 4 m/sec), which indicates that the amount of energy absorbable before the occurrence of cracking is large irrespective of the striker speed. This reveals that the use of a predetermined thermoplastic resin composition makes it possible to exhibit high impact absorption capability irrespective of whether the speed of an input impact is low or high.

The above-described examples are for illustrative purposes only, and shall not be construed as limiting the present invention. Although the present invention has been described with reference to exemplary embodiments, it is understood that the words used in the description and drawings of the present invention are explanatory and illustrative rather than restrictive. As described in detail herein, modifications may be made to the embodiments within the scope of the appended claims without departing from the scope and spirit of the present invention. Although the present invention has been described in detail with reference to particular structures, materials, and examples, the present invention is not intended to be limited to the particulars disclosed herein, rather the present invention extends to all the functionally-equivalent structures, methods, and uses within the scope of the appended claims.

REFERENCE SIGNS LIST

10; Fiber-reinforced material
12; Matrix material
15; Fiber, Fiber assembly
50; Article
A; Continuous phase
B; Dispersed phase
$B_1$; Continuous phase (continuous phase in dispersed phase B)
$B_2$; Fine dispersed phase (dispersed phase in dispersed phase B)
$A_1, A_2$; Continuous phase
$B_{A1}, B_{A2}$; Dispersed phase
$B_{A11}$; Continuous phase (continuous phase in dispersed phase $B_{A1}$)
$B_{A12}$; Fine dispersed phase (dispersed phase in dispersed phase $B_{A1}$)

The invention claimed is:

1. A fiber-reinforced material comprising:
   fiber; and
   a matrix material coating the fiber,
   wherein the matrix material is a thermoplastic resin composition obtained by blending a polyolefin resin, a polyamide resin, and a modified elastomer having a reactive group that reacts with the polyamide resin,
   wherein the modified elastomer is a maleic anhydride-modified ethylene-butene copolymer, and wherein the thermoplastic resin composition has a continuous phase (A) containing the polyolefin resin, and a dispersed phase (B) dispersed in the continuous phase (A) and containing the polyamide resin.

2. The fiber-reinforced material according to claim 1, wherein the fiber is a fiber assembly.

3. The fiber-reinforced material according to claim 1, wherein when a puncture test is performed at a striker speed of 1 m/sec or more but 4 m/sec or less, and when a deflection (mm) when a maximum impact force (N) is applied is defined as $P_M$, and a deflection (mm) at break is defined as $P_B$, $P_B/P_M \geq 4$.

4. The fiber-reinforced material according to claim 3, wherein when an amount of energy (Nmm) absorbed before a maximum impact force (N) is applied is defined as $E_1$, an amount of energy (Nmm) absorbed after a maximum impact force (N) is applied and before break is defined as $E_2$, and a total amount of absorbed energy (Nmm) as a total of the amount of energy $E_1$ and the amount of energy $E_2$ is defined as $E_T$, a ratio of $E_2$ to $E_T$ ($E_2/E_T$) is 70% or more.

5. The fiber-reinforced material according to claim 1, wherein the fiber assembly is a woven/knit fabric.

6. The fiber-reinforced material according to claim 1, wherein the fiber assembly is a non-woven fabric.

7. The fiber-reinforced material according to claim 1, wherein the dispersed phase (B) further contains the modified elastomer, and the dispersed phase (B) has a continuous phase ($B_1$) containing the polyamide resin and a fine dispersed phase ($B_2$) dispersed in the continuous phase ($B_1$) and containing the modified elastomer.

8. An article comprising a fiber-reinforced material according to claim 1.

* * * * *